(12) United States Patent
Kim et al.

(10) Patent No.: US 11,683,584 B2
(45) Date of Patent: Jun. 20, 2023

(54) ELECTRONIC DEVICE AND METHOD FOR SUPPORTING ZOOM FUNCTIONALITY

(71) Applicant: Samsung Electronics Co., Ltd., Gyeonggi-do (KR)

(72) Inventors: Sangheon Kim, Gyeonggi-do (KR); Muyeol Lee, Gyeonggi-do (KR); Jiwoo Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/553,002

(22) Filed: Dec. 16, 2021

(65) Prior Publication Data
US 2022/0132021 A1   Apr. 28, 2022

Related U.S. Application Data

(63) Continuation of application No. PCT/KR2021/014868, filed on Oct. 22, 2021.

(30) Foreign Application Priority Data

Oct. 22, 2020   (KR) .................. 10-2020-0137398

(51) Int. Cl.
*H04N 23/67* (2023.01)
*G02B 7/28* (2021.01)
(Continued)

(52) U.S. Cl.
CPC ............. *H04N 23/67* (2023.01); *G02B 7/282* (2013.01); *G06F 16/9537* (2019.01); *H04N 23/66* (2023.01)

(58) Field of Classification Search
CPC ...... H04N 23/67; H04N 23/66; H04N 23/631; H04N 23/69; H04N 23/661; G02B 7/282; G06F 16/9537
See application file for complete search history.

(56) References Cited

U.S. PATENT DOCUMENTS 7,136,093 B1   11/2006   Itoh et al.
10,368,378 B2   7/2019   Foster et al.
(Continued)

FOREIGN PATENT DOCUMENTS

KR   1020160136131   11/2016
KR   10-2104088   4/2020
(Continued)

OTHER PUBLICATIONS

International Search Report dated Jan. 24, 2022 issued in counterpart application No. PCT/KR2021/014868, 9 pages.

*Primary Examiner* — Gevell V Selby
(74) *Attorney, Agent, or Firm* — The Farrell Law Firm, P.C.

(57) ABSTRACT

An electronic device and method thereof are provided. An electronic device includes a UWB communication module configured to transmit a first ranging message, at a first transmission interval, for measuring at least one of a distance to or a direction of an external electronic device; a display; and a processor configured to display, on the display, an image of a first magnification in correspondence to the measured distance to and/or direction of the external electronic device; adjust the magnification of the image to a second magnification; and control, based on the second magnification, the UWB communication module to transmit a second ranging message, to the external electronic device, at a second transmission interval.

20 Claims, 10 Drawing Sheets

(51) Int. Cl.
*G06F 16/9537* (2019.01)
*H04N 23/66* (2023.01)

(56) References Cited

U.S. PATENT DOCUMENTS

| | | | |
|---|---|---|---|
| 10,652,925 | B2 | 5/2020 | Naguib et al. |
| 2003/0174048 | A1 | 9/2003 | McCorkle |
| 2008/0239102 | A1* | 10/2008 | Okada .................. H04N 23/661 348/240.99 |
| 2010/0311347 | A1* | 12/2010 | Le Thierry D'Ennequin .............. H04N 23/661 455/67.11 |
| 2016/0240023 | A1 | 8/2016 | Toivonen et al. |
| 2017/0034410 | A1* | 2/2017 | Yoo ...................... H04N 23/632 |
| 2017/0118323 | A1 | 4/2017 | Kim et al. |
| 2020/0267326 | A1 | 8/2020 | Yim |

FOREIGN PATENT DOCUMENTS

| | | |
|---|---|---|
| KR | 1020200035205 | 4/2020 |
| KR | 1020200101207 | 8/2020 |
| KR | 1020200113007 | 10/2020 |

* cited by examiner

ELECTRONIC DEVICE AND METHOD FOR SUPPORTING ZOOM FUNCTIONALITY

CROSS-REFERENCE TO RELATED APPLICATIONS

This application is a Bypass Continuation Application of International Application No. PCT/KR2021/014868, which was filed on Oct. 22, 2021, and is based on and claims priority under 35 U.S.C. § 119 to Korean Patent Application No. 10-2020-0137398, which was filed in the Korean Intellectual Property Office filed on Oct. 22, 2020, the entire disclosure of each of which is incorporated herein by reference.

BACKGROUND

1. Field

The disclosure relates generally to an electronic device and method for supporting a zoom function.

2. Description of the Related Art

With the advancement of hardware technology and changes in user environments, in addition to basic communication functions, diverse and composite functions are being integratedly implemented in electronic devices. For example, various functions such as autofocus (AF) and optical image stabilization (OIS) are being implemented in camera modules of electronic devices, and attempts are being made to mount a zoom lens that can vary the size of a target object by variably adjusting the focal length through zoom-in and zoom-out functions.

Additionally, electronic devices may support various communication methods in addition to cellular communication, e.g., short-range wireless communication such as Bluetooth, Wi-Fi, and near field communication (NFC), which have been developed to support ultra-wideband (UWB) communication.

However, when measuring a movement distance of a subject (e.g., external electronic device) by using a depth camera of an electronic device including a plurality of cameras, the movement distance of the subject in an image obtained by the zoom-in function and the movement distance of the subject in an image obtained by the zoom-out function may be different from the actual movement distance of the subject.

SUMMARY

The disclosure is provided to address at least the above-mentioned problems and/or disadvantages and to provide at least the advantages described below.

Accordingly, an aspect of the disclosure is to provide an apparatus and method that control wireless communication signals based on the magnification of an image obtained by an electronic device.

In accordance with an aspect of the disclosure, an electronic device may include a UWB communication module; a display; and at least one processor operably connected to the UWB communication module and the display, wherein the UWB communication module may be configured to transmit a first ranging message at a first transmission interval to measure the distance to and/or direction of an external electronic device, and wherein the at least one processor may be configured to display, on the display, an image of a first magnification in correspondence to the measured distance to and/or direction of the external electronic device; adjust the magnification of the image to a second magnification; and control, based on the adjusted second magnification, the UWB communication module to transmit a second ranging message to the external electronic device at a second transmission interval.

In accordance with another aspect of the disclosure, an operation method of an electronic device may include transmitting a first ranging message at a first transmission interval to measure the distance to or direction of an external electronic device; displaying, on a display, an image of a first magnification in correspondence to the measured distance to and/or direction of the external electronic device; adjusting a magnification of the displayed image to a second magnification; and adjusting the transmission interval of a second ranging message transmitted to the external electronic device to a second transmission interval based on the adjusted second magnification.

The electronic device may identify an external electronic device by obtaining location information of the external electronic device through wireless communication (e.g., UWB communication). The location information of an external electronic device may include distance information and/or angle (e.g., angle of arrival (AOA)) information between the electronic device and the external electronic device. The electronic device may display an image (e.g., preview image) obtained through a plurality of cameras based on the location information of the external electronic device identified by using wireless communication.

According to various embodiments of the disclosure, an electronic device may obtain an image by tracking a target object moving at a short distance or at a long distance. It is also possible to provide a fast AF function for a moving subject by differently controlling a transmission interval of wireless communication signals transmitted to an external electronic device based on magnification of obtained images.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, various embodiments of the disclosure will be described in detail with reference to accompanying drawings. Descriptions of well-known functions and constructions are omitted for the sake of clarity and conciseness.

Figure 1:
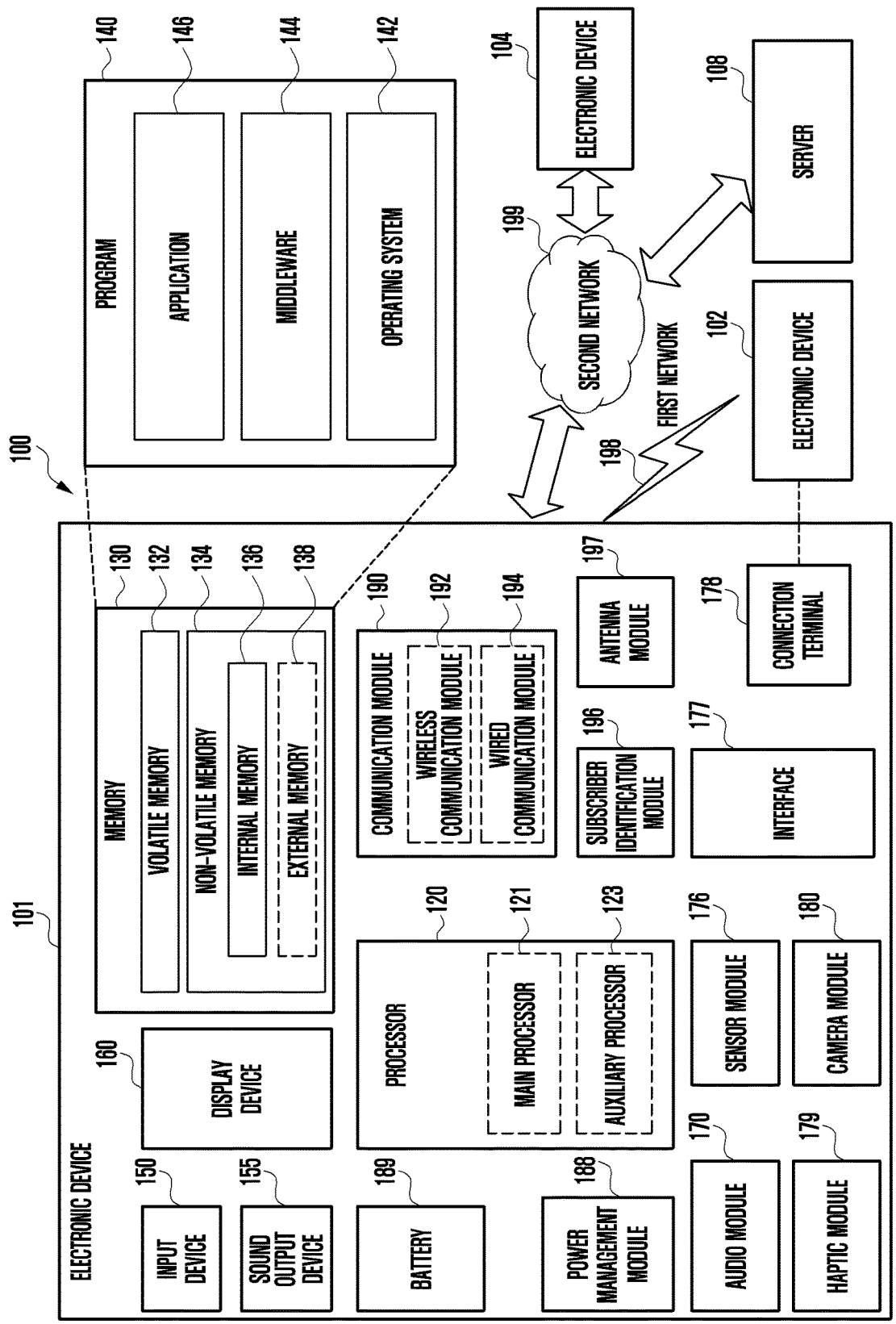
FIG. 1 illustrates an electronic device in a network environment according to an embodiment.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification (ID) module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the NPU) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent DNN (BRDNN), deep Q-network or a combination of two or more thereof, but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or IR data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a PCB, a RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or MEC. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
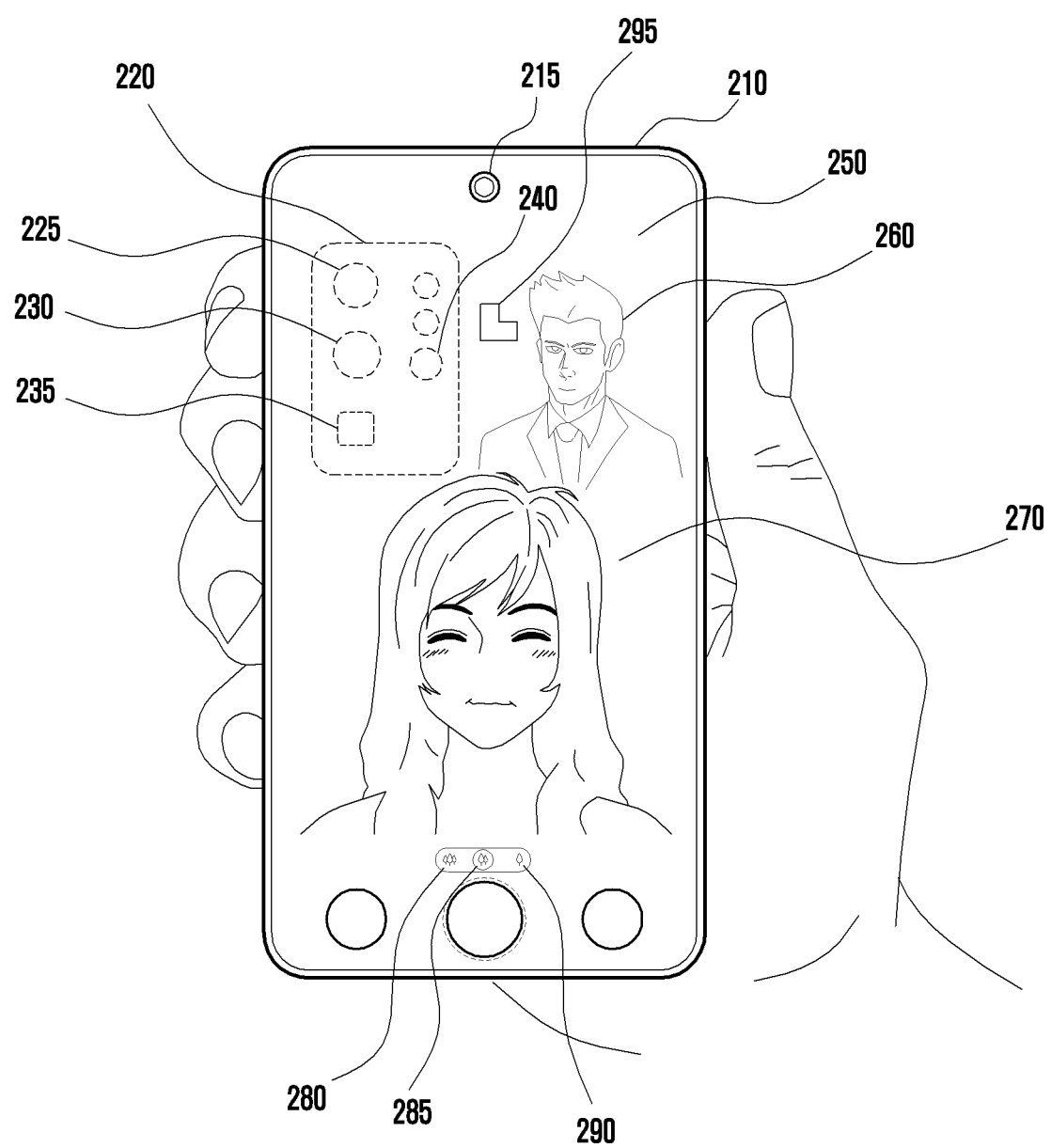
FIG. 2 illustrates a camera function of an electronic device according to an embodiment.

FIG. 2 illustrates using a camera function of an electronic device according to an embodiment.

Referring to FIG. 2, the electronic device 210 may use the camera module 220 to obtain an image of a subject, e.g., a first subject 270, located within a specified distance from the electronic device 210 (e.g., a short distance) and/or a second subject 260 located outside the specified distance from the electronic device 210 (e.g., a long distance).

The camera module 220 includes a depth camera 240. The depth camera 240 may use a time-of-flight (ToF) sensor to measure the distance from the electronic device 210 to the subject and/or to track the movement of the subject. The ToF sensor may include an emitter to output an IR ray and a receiver to receive a reflected IR ray. The electronic device 210 may measure the distance to the subject and sense the movement of the subject by using IR rays that are output from the emitter of the ToF sensor and received by the receiver. For example, the electronic device 210 may provide a live focus function by distinguishing the subject from the background based on the distance to the subject measured through the ToF sensor. The electronic device 210 may also provide an AF function by tracking the movement of the subject with the ToF sensor. The depth camera 240 using a ToF sensor may have difficulty in measuring the distance to the subject and/or tracking the movement of the subject when the subject is outside a specified distance from the electronic device 210.

The electronic device 210 includes a front camera 215 on the front side, and a rear camera module 220 on the rear side. The rear camera module 220 may include a plurality of cameras with different uses. For example, the rear camera module 220 includes first to fourth cameras 240, 225, 230, and 235. The first camera 240 may be the depth camera. The second camera 225 may be an ultra-wide camera, which may be used to photograph a landscape, and the camera angle of view may be about 120 degrees. The third camera 230 may be a wide camera, which may be used to photograph a person or a landscape, and the camera angle of view may be about 80 degrees. The fourth camera 235 may be a telecamera, which may be used to photograph a subject, food, or a person at a long distance, and the camera angle of view may be about 20 to 80 degrees. The subject photographed by each camera described herein is merely an example and is not limited thereto. For example, the electronic device may photograph a person by using the second camera 225. Alternatively, one of the front camera 215 and the rear camera module 220 may be omitted.

The electronic device 210 further includes a display 250 for displaying a target object, and an antenna module 295 (e.g., UWB antenna) for identifying the location of an external electronic device (e.g., the first subject 270 or the second subject 260).

The antenna module 295 may include a plurality of antennas for measuring the location of an external electronic device. For example, the electronic device 210 may use at least two antennas among the plural antennas included in the antenna module 295 to measure the distance to and/or angle (e.g., AOA) with the external electronic device.

At least one application using the camera 215, 225, 230, 235, or 240 may be installed in the electronic device 210. At least some of the applications using the camera 215, 225, 230, 235, or 240 may measure distance information and/or direction information of a subject (e.g., external electronic device) by using the communication module (e.g., a UWB communication module) of the electronic device 210. The user may photograph a subject by executing an installed application. The user may select the camera 215, 225, 230, 235, or 240 to photograph the subject. The application may provide an icon through which the user can select the camera 215, 225, 230, 235, or 240. A first icon 280 may be for selecting the first camera 225, and a second icon 285 may be for selecting the second camera 230. A third icon 290 may be for selecting the third camera 235.

In accordance with an embodiment of the disclosure, a method is provided that measures the distance to a target object and/or tracks the movement of the subject by using various cameras 215, 225, 230, 235, and 240 and UWB communication, and focuses on the subject based on the tracked movement.

Figure 3:
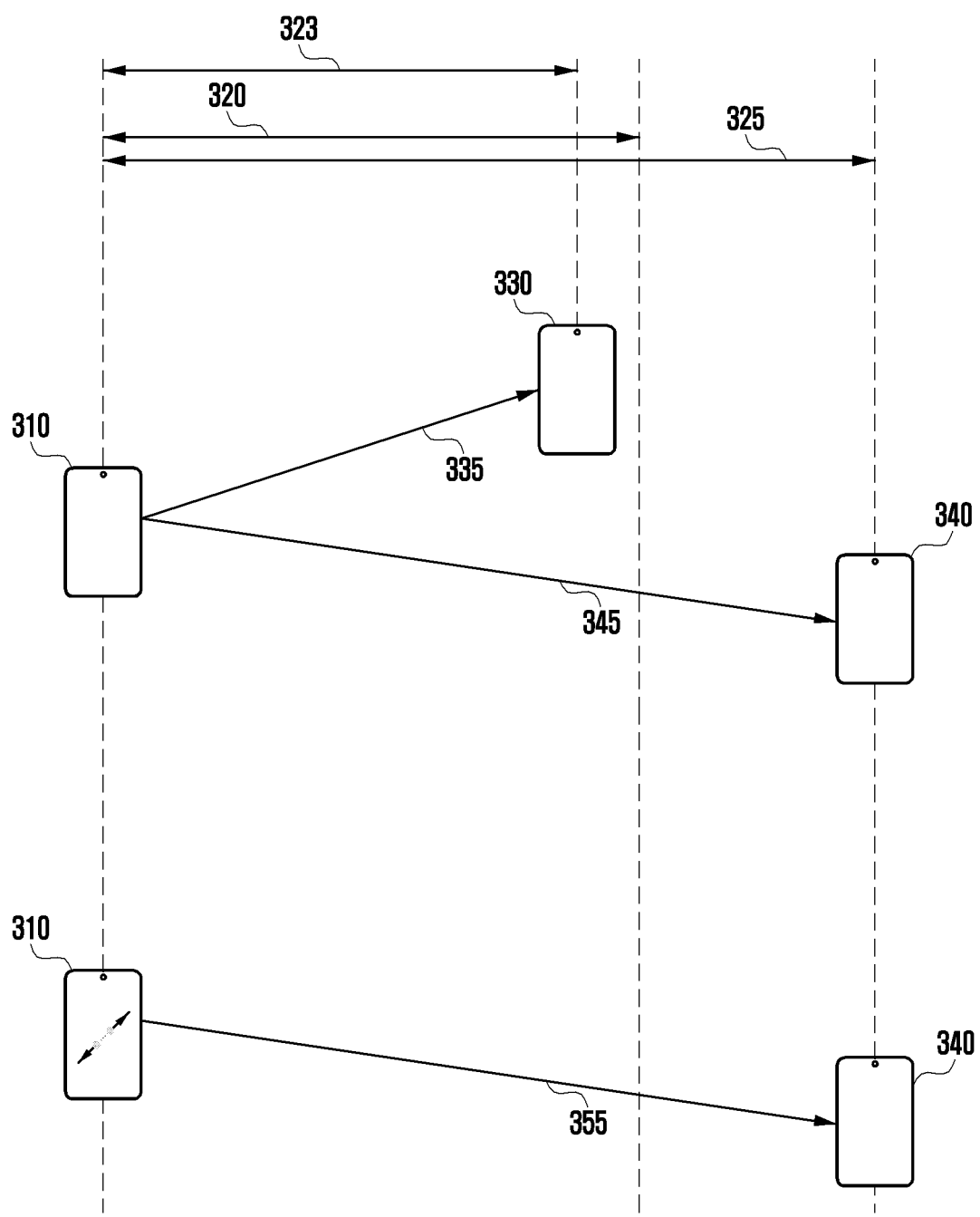
FIG. 3 illustrates a method of using a camera based on a distance to a subject according to an embodiment.

FIG. 3 illustrates a method of using a camera based on a distance to a subject according to an embodiment.

Referring to FIG. 3, the electronic device 310 photographs a first subject at a first distance 323, which is shorter than a short threshold distance 320, and/or a second subject at a second distance 325, which is longer than the short threshold distance 320. The first subject 270 and the second subject 260 may each be, e.g., a person, and the first subject 270 may carry a first electronic device 330 and the second subject 260 may carry a second electronic device 340.

Herein, the short threshold distance 320 may be a distance measurable by a ToF sensor, but is not limited thereto.

The electronic device 310 may search for a nearby external electronic device by using, e.g., short-range communication such as Bluetooth™ communication. The electronic device 310 may connect to the found external electronic device through UWB communication. For example, when the first electronic device 330 and/or the second electronic device 340 are found through short-range communication, the electronic device 310 may transmit information for UWB communication through short-range communication. The electronic device 310 may connect to the first electronic device 330 and/or the second electronic device 340 through UWB communication based on the transmitted information.

The electronic device 310 may broadcast a ranging message (e.g., ranging control message or ranging request message) to the external electronic device (e.g., the first electronic device 330 or the second electronic device 340). The electronic device 310 may broadcast a ranging request message at a first transmission interval. The electronic device 310 may receive a ranging response message from the first electronic device 330 and/or second electronic device 340 having received the ranging request message, and may identify the locations of the first electronic device 330 and/or the second electronic device 340 relative to the electronic device 310 based on the ranging response message. The electronic device 310 may check whether the first electronic device 330 and/or the second electronic device 340 are located within the angle of view of the activated camera of the electronic device 310, and may display the first electronic device 330 and/or the second electronic device 340 on the display if included in the angle of view of the camera. The electronic device 310 may transmit and receive user ID, electronic device ID information, distance information, and/or direction information to and from the first electronic device 330 and/or the second electronic device 340 through UWB communication.

The electronic device 310 may measure the distance to and/or direction of the first electronic device 330 by using UWB communication. The electronic device 310 may also measure the distance to and/or direction of the second electronic device 340 by using UWB communication. To measure the distance to and/or direction of the first electronic device 330 and/or the second electronic device 340, the electronic device 310 may transmit a ranging message to the first electronic device 330 and/or the second electronic device 340 at regular time intervals. For example, the electronic device 310 may transmit ranging messages 335 and 345 to the first electronic device 330 and/or the second electronic device 340 at a first transmission interval.

The electronic device 310 may perform a zoom-in function while photographing the target object 260 carrying the second electronic device 340. A second transmission interval during which the electronic device 310 transmits a second ranging message (355) after initiating the zoom-in function may be different from the first transmission interval during which the electronic device 310 transmits a first ranging message (335, 345) before initiating the zoom-in function. The second transmission interval during which the electronic device 310 transmits a second ranging message (355) after initiating the zoom-in function may be shorter than the first transmission interval during which the electronic device 310 transmits a first ranging message (335, 345) before initiating the zoom-in function.

The electronic device 310 may transmit a ranging message at a first transmission interval for 1× zoom, and may transmit a ranging message at a second transmission interval for 4× zoom. The electronic device 310 may transmit a ranging message at a third transmission interval for 0.5× zoom. The first transmission interval may be longer than the second transmission interval or may be shorter than the third transmission interval. When the electronic device 310 adjusts the magnification to 1× zoom again, it may transmit a ranging message at the first transmission interval. The ranging message may include a flag indicating information on the transmission interval.

Figure 4:
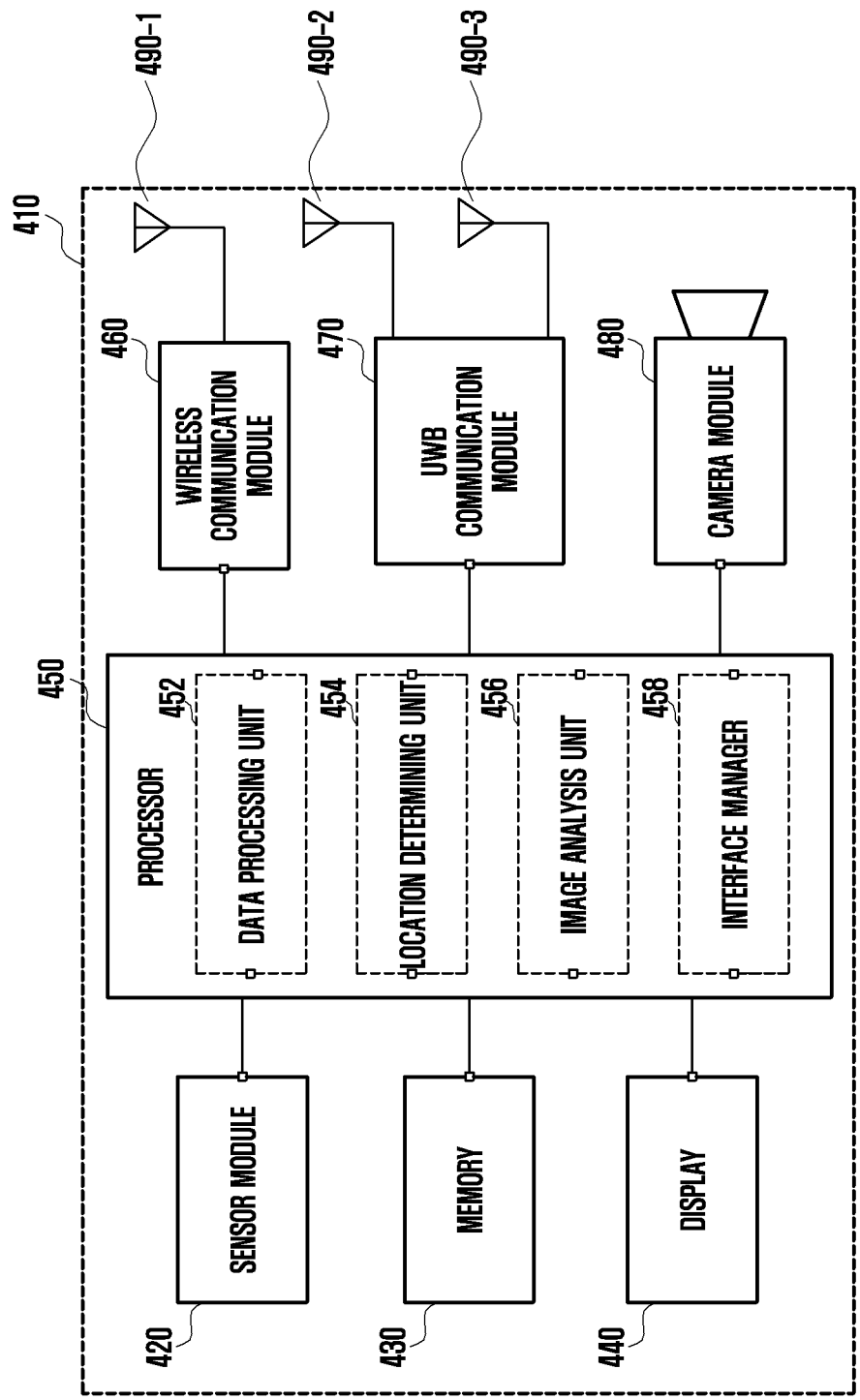
FIG. 4 illustrates an electronic device that photographs a subject by using UWB communication according to an embodiment.

FIG. 4 illustrates an electronic device that photographs a subject by using UWB communication according to an embodiment.

Referring to FIG. 4, the electronic device 410 includes a sensor module 420, a memory 430, a display 440, a processor 450, a wireless communication module 460, a UWB communication module 470, a camera module 480, and antennas 490-1, 490-2 and 490-3. However, the configuration in FIG. 4 is only an example, and some of the modules may be omitted or be implemented as a single module, or other modules may be added.

The sensor module 420 may include a gyro sensor, an acceleration sensor, and/or a geomagnetic sensor to sense a state of the electronic device 410. The electronic device 410 may determine whether the electronic device 410 is in a portrait mode or in a landscape mode by using the sensor module 420. The electronic device 410 may determine the relative azimuth with respect to the reference azimuth by using the sensor module 420, e.g., the geomagnetic sensor. The electronic device 410 may obtain a final azimuth using UWB based on the relative azimuth with respect to the reference azimuth using the geomagnetic sensor and a UWB AOA. The sensor module 420 may be used as a 9-axis motion sensor using a gyro sensor, an acceleration sensor, and a geomagnetic sensor, and the 9-axis motion sensor may be used to determine azimuth information, roll information, and/or pitch information.

The memory 430 may store various data used in the electronic device 410. The memory 430 may store previous communication connection history information (e.g., connection information using MAC information and short-range communication (e.g., WI-FI and/or Bluetooth™), contact related information (e.g., profile information such as account, contact, profile picture, etc.), applications, captured images, or captured videos.

The display 440 may display an image photographed or to be photographed using the camera module 480. The display 440 may include a touch circuit configured to sense a touch, or a sensor circuit (e.g., pressure sensor) configured to measure the strength of the force generated by a touch. Accordingly, the display 440 may not only display processed data or information (e.g., location, direction, and movement direction), but may also receive an input from the user to operate.

The processor 450 includes a data processing unit 452, a location determining unit 454, an image analysis unit 456, and an interface manager 458. The data processing unit 452 may generate a captured image as data (e.g., a processing data unit (PDU)) in response to a user input, and transmit the generated data to an external device by using the wireless communication module 460. The location determining unit 454 may use first azimuth information (e.g., relative azimuth with respect to reference azimuth) received from the sensor module 420 and the distance or AOA received from the UWB communication module 470 to determine the final azimuth based on second azimuth information (e.g., AOA) between the electronic device 410 and an external electronic device. The location determining unit 454 may receive satellite positioning information from a GNSS to improve accuracy for the shooting direction information. The image analysis unit 456 may analyze a shooting scene by using an image captured by the activated camera, and may generate at least one scene message and provide it to the camera interface. The scene message may include scene analysis information. For example, whether food, a person, a group, or a landscape is included in the scene may be analyzed, and information related thereto may be included in a scene message.

The interface manager 458 may generate an indicator for the moving direction of the target object in response to the analyzed shooting scene information and shooting direction information (e.g., distance information and/or AOA information), and display it on the display.

The wireless communication module 460 may include one or more CPs and may allow the electronic device 410 to perform cellular communication or short-range communication with an external electronic device. The electronic device 410 may transmit a captured image to an external electronic device by using the wireless communication module 460. The wireless communication module 460 may use, but is not limited to, a short-range communication network such as Bluetooth™, Wi-Fi direct or IrDA, and a long-range network such as a legacy cellular network, a 5G network, a next-generation communication network, the Internet, or a computer network.

The UWB communication module 470 may allow the electronic device 410 to perform UWB communication with an external electronic device. The UWB communication module 470 may measure the distance between the electronic device 410 and the external electronic device through UWB communication. The UWB communication module 470 may measure the direction (e.g., AOA) of the external electronic device by using the antennas 490-1, 490-2, and 490-3. Although the wireless communication module 460 and the UWB communication module 470 are separately described herein, they may be formed as one communication module. Additionally, UWB communication and Wi-Fi 6 may be supported by a single module because some frequency bands used may overlap.

The camera module 480 may include a front camera or a rear camera module. The rear camera module may include at least one camera as described above with reference to FIG. 2. The rear camera module may include a depth camera, an ultra-wide camera, a wide camera, and/or a tele-camera.

The first antenna 490-1 may be used for wireless communication, and the second antenna 490-2 and the third antenna 490-3 may be used for UWB communication. For example, a large amount of data may be transmitted through the first antenna 490-1. The second antenna 490-2 and/or the third antenna 490-3 may be used to transmit data or to measure the distance to or direction of an external device. The electronic device 410 may measure the distance to an external electronic device by using at least one of the antennas 490-1, 490-2, and 490-3, and may measure the direction of the external electronic device by using at least two of the antennas 490-1, 490-2, and 490-3. For example, if antenna 490-2 or 490-3 is used for UWB communication, it may include, but not limited to, a frame antenna, a patch antenna, or an antenna using laser direct structuring (LDS).

Figure 5:
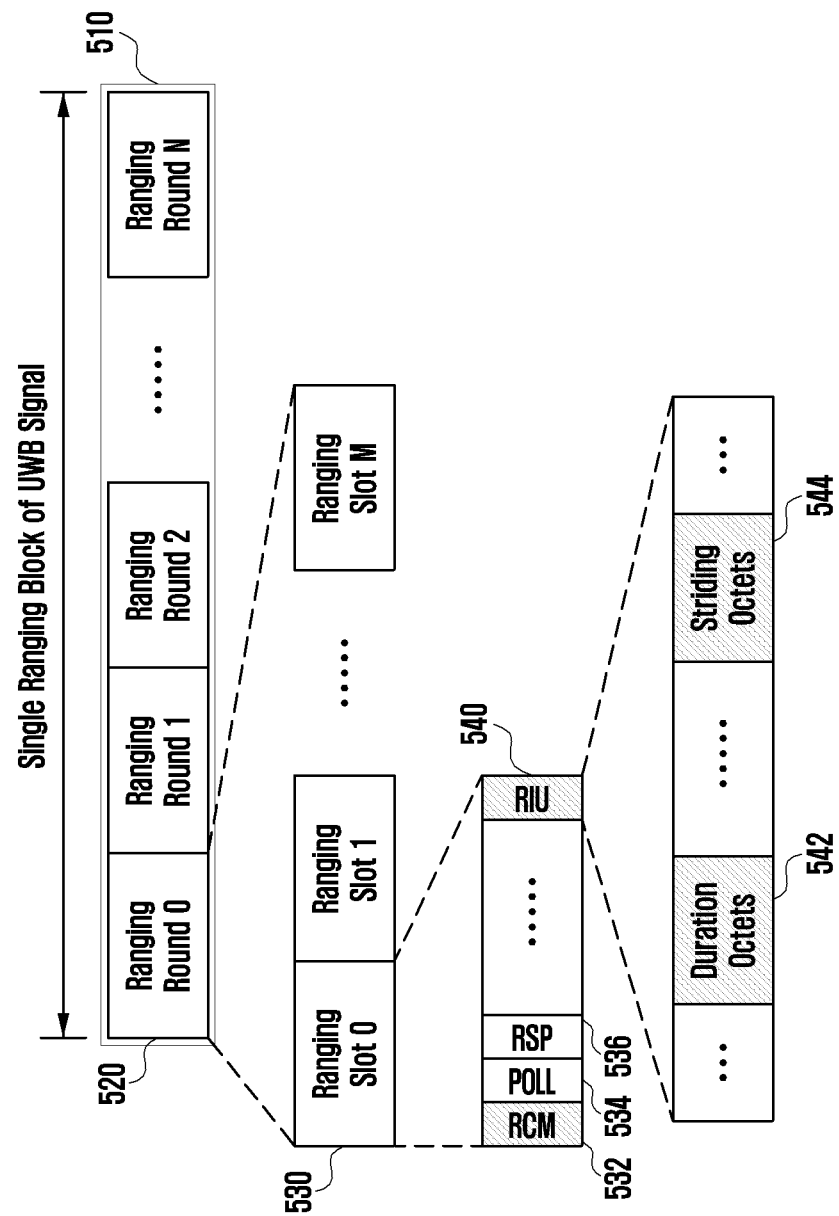
FIG. 5 illustrates a ranging block for ranging messages according to an embodiment.

FIG. 5 illustrates a ranging block for ranging messages according to an embodiment.

Referring to FIG. 5, the ranging block 510 may indicate a period during which the electronic device measures a distance to or direction of an external electronic device. The ranging block 510 includes a plurality of ranging rounds 520.

A ranging round 520 may indicate a period during which the electronic device measures the distance to the external electronic device. One ranging round 520 may include a plurality of ranging slots 530.

A ranging slot 530 may be a period for transmitting one data frame. The ranging slot 530 includes a ranging control message 532, a ranging request message (poll) 534, a ranging response message 536, and a ranging interval update (RIU) message 540. The ranging request message 534 may be used by the electronic device to request the external electronic device to measure the distance. The ranging response message 536 may be transmitted by the external electronic device to the electronic device in response to the ranging request message 534. The RIU message 540 includes duration octets 542 indicating an update period of the ranging block, and/or striding octets 544 controlling the hopping mode of the ranging block.

When the electronic device receives a ranging control message 532, the electronic device may use field values of the ranging control information element (IE) included in the ranging control message 532 to establish a structure of a ranging block and a related timeline for ranging. The ranging block structure may be configured by a next higher layer.

The electronic device may repeatedly transmit the ranging block structure through all ranging control messages. When the ranging block structure is to be changed or updated, the electronic device may transmit a ranging block update (RBU) IE including an RBU related field.

To transmit a ranging message, an interval-based mode or a block-based mode may be used. The block-based mode uses a strict time structure, but the interval-based mode may not. The block-based mode may indicate the next ranging round with a round index, and the interval-based mode may indicate the next ranging round with a time interval. The processor may select one of the modes and specify the corresponding mode by using a time structure identifier of a ranging control IE.

The block-based mode may use a ranging block structure using a timeline set at a preset period. In the block-based mode, the ranging block structure may be determined based on the ranging block duration field, ranging round duration field, and/or ranging slot duration field included in the information about the ranging control. The information on the ranging control may be an advanced ranging control IE.

Figure 6:
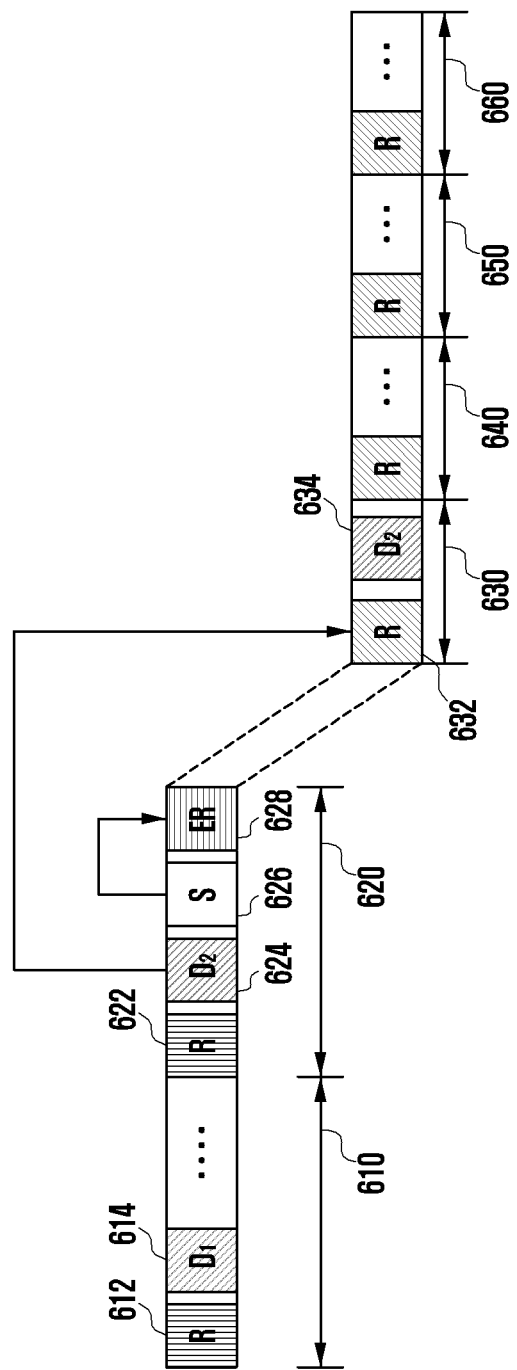
FIG. 6 illustrates an electronic device controlling a transmission interval for a ranging block of a ranging message according to an embodiment.

FIG. 6 illustrates an electronic device controlling a transmission interval for a ranging block of a ranging message according to an embodiment.

Referring to FIG. 6, when the camera function is executed, the electronic device may generate a first ranging message including a first ranging block 610, and transmit it to an external electronic device. The first ranging block 610 includes a ranging control message 612 indicating information related to the zoom-in function, or an RIU message including information on the transmission interval of the ranging block (e.g., first transmission interval and second transmission interval). Information on the transmission interval of the ranging block may be included in the duration octets 614 of the RIU message and may be set as a first transmission interval.

The electronic device may perform the zoom-in function while transmitting the first ranging block 610. The electronic device may transmit zoom-in related information to the external electronic device at a first transmission interval by using the second ranging block 620. The electronic device may include information indicating initiation of zoom-in in the ranging control message 622 included in the second ranging block 620. Information on the transmission interval of the ranging block (e.g., second transmission interval) may be included in the duration octets 624 of the RIU message included in the second ranging block 620. When the zoom-in operation is detected, the transmission interval of the ranging block may be changed to a second transmission interval shorter than the first transmission interval. The striding octets 626 of the RIU message included in the second ranging block 620 may include information indicating movement to the last ranging round 628 of the second ranging block 620. Upon receiving the second ranging block 620, if the striding octets 626 include information indicating movement to the last ranging round 628, the external electronic device may skip the remaining ranging rounds of the first ranging message and generate a second ranging message including a third ranging block 630 having a second transmission interval.

The first ranging message may include a first ranging block 610 and a second ranging block 620, and the second ranging message may include a third ranging block 630.

The electronic device in zoom-in operation may transmit a second ranging message including a third ranging block 630 to the external electronic device at a second transmission interval. The third ranging block 630 may include a ranging control message 632 including information indicating execution of zoom-in, and duration octets 634 indicating information on the transmission interval of the ranging block. The duration octets 634 may include a second transmission interval.

While the zoom-in state is maintained, the electronic device may transmit a fourth ranging block 640, a fifth ranging block 650, and a sixth ranging block 660, which are identical to the third ranging block 630, at the second transmission interval.

Figure 7:
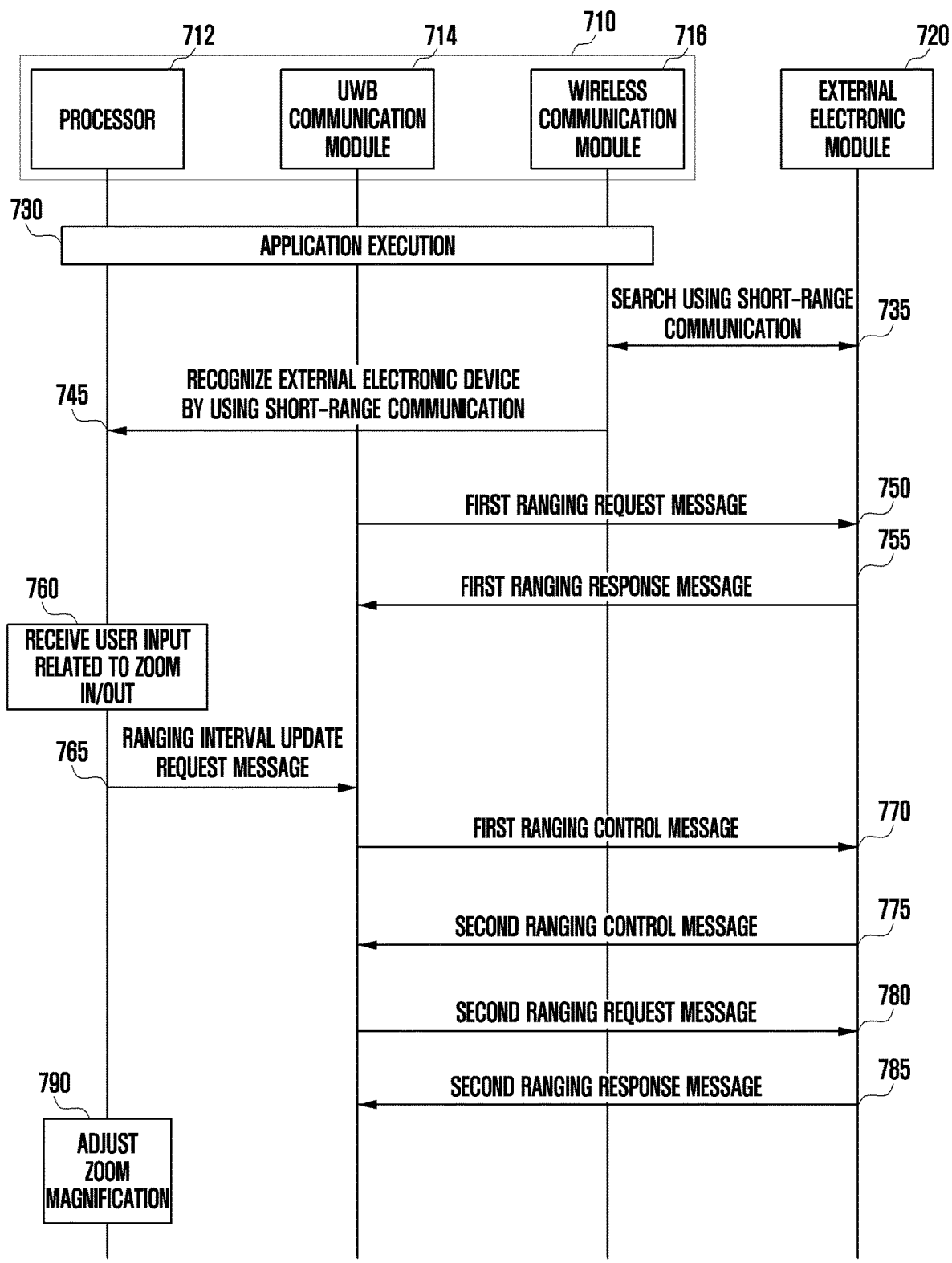
FIG. 7 is a signal flow diagram for an electronic device utilizing a zoom function of a camera according to an embodiment.

FIG. 7 is a signal flow diagram for an electronic device utilizing a zoom function of a camera according to an embodiment.

Referring to FIG. 7, the electronic device 710 may support a zoom function of the camera. The electronic device 710 includes a processor 712, a UWB communication module 714, and a wireless communication module 716. The camera module may be included in the electronic device 710, but it may also be formed as a separate module and connected to the electronic device 710.

In step 730, as a camera-related application is executed, the processor 712 of the electronic device 710 controls the camera module, the UWB communication module 714, and/or the wireless communication module 716. For example, when the application is executed, the processor 712 activates the UWB communication module 714 and the wireless communication module 716.

In step 735, the wireless communication module 716 searches for a nearby electronic device by using short-range communication, e.g., Bluetooth™ communication.

In step 745, the processor 712 recognizes an external electronic device 720 capable of UWB communication by using the short-range communication.

In step 750, the UWB communication module 714 transmits a first ranging request message at a first transmission interval to the external electronic device 720.

In step 755, the external electronic device 720 transmits a first ranging response message at the first transmission interval in response to the first ranging request message.

In step 760, the electronic device 710 receives a user input for executing a zoom in/out function through a camera interface. The electronic device 710 may determine whether a zoom in or out function is executed by using the processor 712.

In step 765, the processor 712 transmits an RIU request message to the UWB communication module 714 according to a user input for zooming in or out. For example, the processor 712 measures the drag length between multi-touch inputs input by the user for zooming in. The zoom-in magnification may vary according to the received drag length. As another example, the processor 712 measures the drag length between multi-touch inputs input by the user for zooming out. The zoom-out magnification may vary according to the received drag length. The directions of the multi-touch inputs for zoom-in and zoom-out may be opposite to each other.

When the user input corresponds to zoom-in, the processor 712 may transmit an RIU request message indicating the second transmission interval shorter than the first transmission interval. When the user input corresponds to zoom-out, the processor 712 may transmit an RIU request message indicating the third transmission interval longer than the first transmission interval. The values of the second transmission interval and third transmission interval may vary depending on zoom-in and zoom-out magnifications. The processor 712 may determine the transmission interval according to the magnification indicated by a user input.

In step 770, the UWB communication module 714 transmits a first ranging control message including an RIU message to the external electronic device 720 at the first transmission interval. For example, the RIU message includes a second transmission interval shorter than the first transmission interval.

In step 775, the UWB communication module 714 receives, through the UWB communication module 714, a second ranging control message indicating adjustment to the second transmission interval in response to the first ranging control message including the RIU message.

In step 780, according to the determined second transmission interval, the UWB communication module 714 transmits a second ranging request message to the external electronic device 720 at the second transmission interval.

In step 785, the electronic device 710 receives a second ranging response message from the external electronic device 720 at the second transmission interval in response to the second ranging request message.

In step 790, the electronic device 710 adjusts the zoom magnification based on the received second ranging response message. Step 790 may be performed after operation 760 or may be performed simultaneously with at least some of operations 765 to 785.

Figure 8:
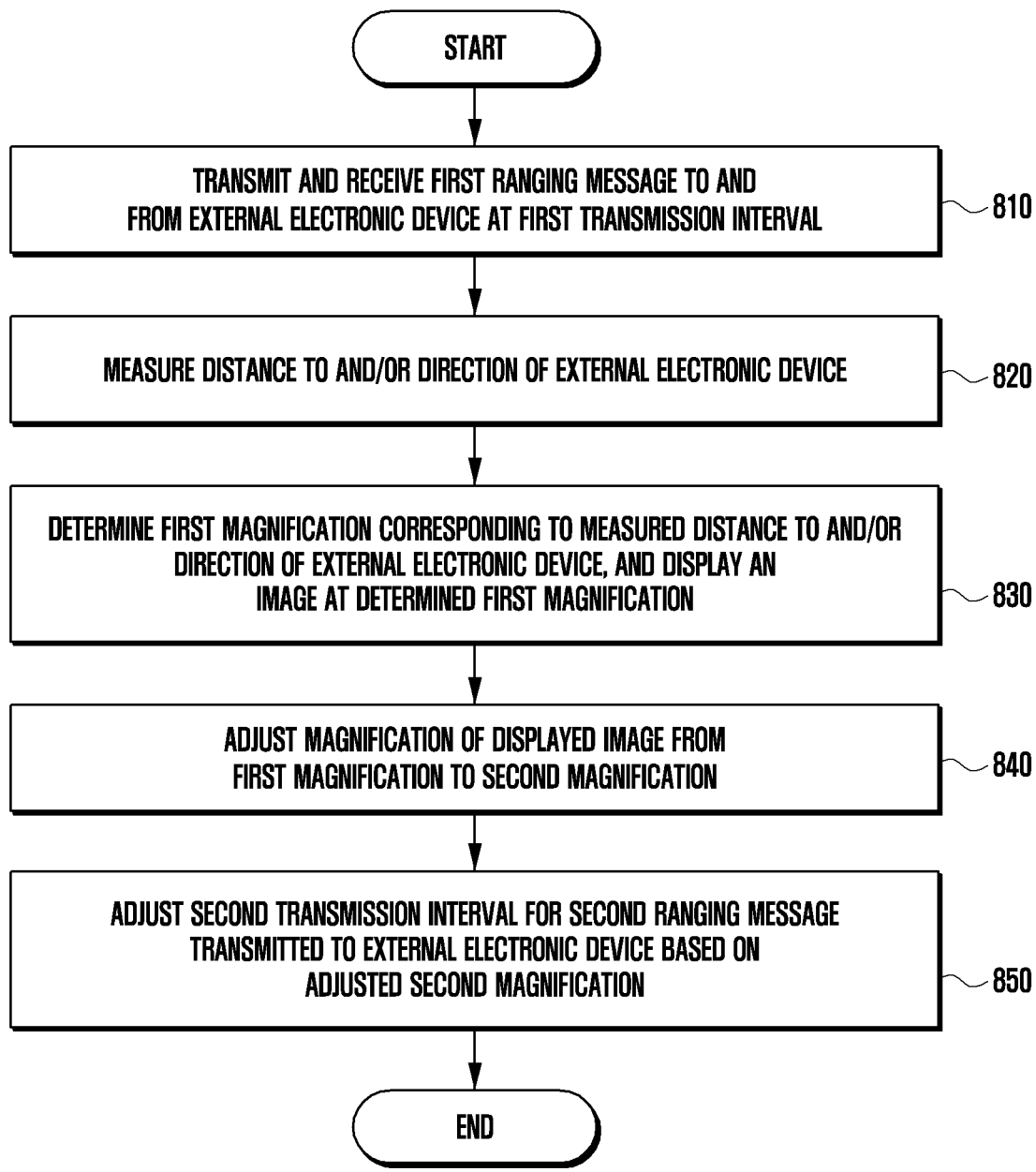
FIG. 8 is a flowchart illustrating a method of an electronic device according to an embodiment.

FIG. 8 is a flowchart illustrating a method of an electronic device according to an embodiment.

Referring to FIG. 8, the electronic device may execute a function including zoom in/out using a camera. For example, a camera application or a navigation application may perform zoom in/out using a camera. Such an application may measure the distance to and/or direction of an external electronic device by using short-range communication of the electronic device (e.g., zoom in/out). The application may be executed initially at a preset magnification. For example, the initial magnification of the camera application may be set according to the type of the activated camera, and the initial magnification of the navigation application may be set according to the movement speed of the electronic device.

The electronic device may search for an external electronic device by using short-range communication. The electronic device may recognize the external electronic device capable of UWB communication by using short-range communication. The electronic device may transmit information for UWB communication to the external electronic device by using short-range communication. The electronic device may be connected to the external electronic device through the UWB communication.

More specifically, in step 810, the electronic device transmits and receives a ranging message to and from the external electronic device at a first transmission interval by using UWB communication. The ranging message may include a ranging request message and a ranging response message. When the electronic device transmits a ranging request message to the external electronic device at the first transmission interval, the external electronic device may transmit a ranging response message as a response to the electronic device at the first transmission interval.

In step 820, the electronic device measures the distance to and/or direction of the external electronic device by using the received ranging message. The electronic device may determine distance information (e.g., ranging information) about the external electronic device based on the time difference between transmission of the ranging request message and reception of the ranging response message, and determine relative direction information of the external electronic device through the reception phase difference therebetween. The electronic device may use one-way ranging and/or TWR for measuring the distance to the external electronic device. In a one-way ranging method, the electronic device and the external electronic device are synchronized; the electronic device transmits a ranging request message to the external electronic device; the external electronic device transmits a ranging response message including time information to the electronic device; and the electronic device measures the distance to the external electronic device by measuring the arrival time of the ranging response message.

In the two-way ranging method, the electronic device and the external electronic device are not synchronized, and transmit and receive signals several times in order to share their respective time information for measuring the distance.

The one-way ranging method can measure the distance even if communication is performed only once, so that the time required for distance measurement is small and power consumption can be small. However, while the two-way ranging method requires a large amount of power consumption and takes a long time to transmit and receive signals several times, synchronization between the two electronic devices may be not required.

Figure 9:
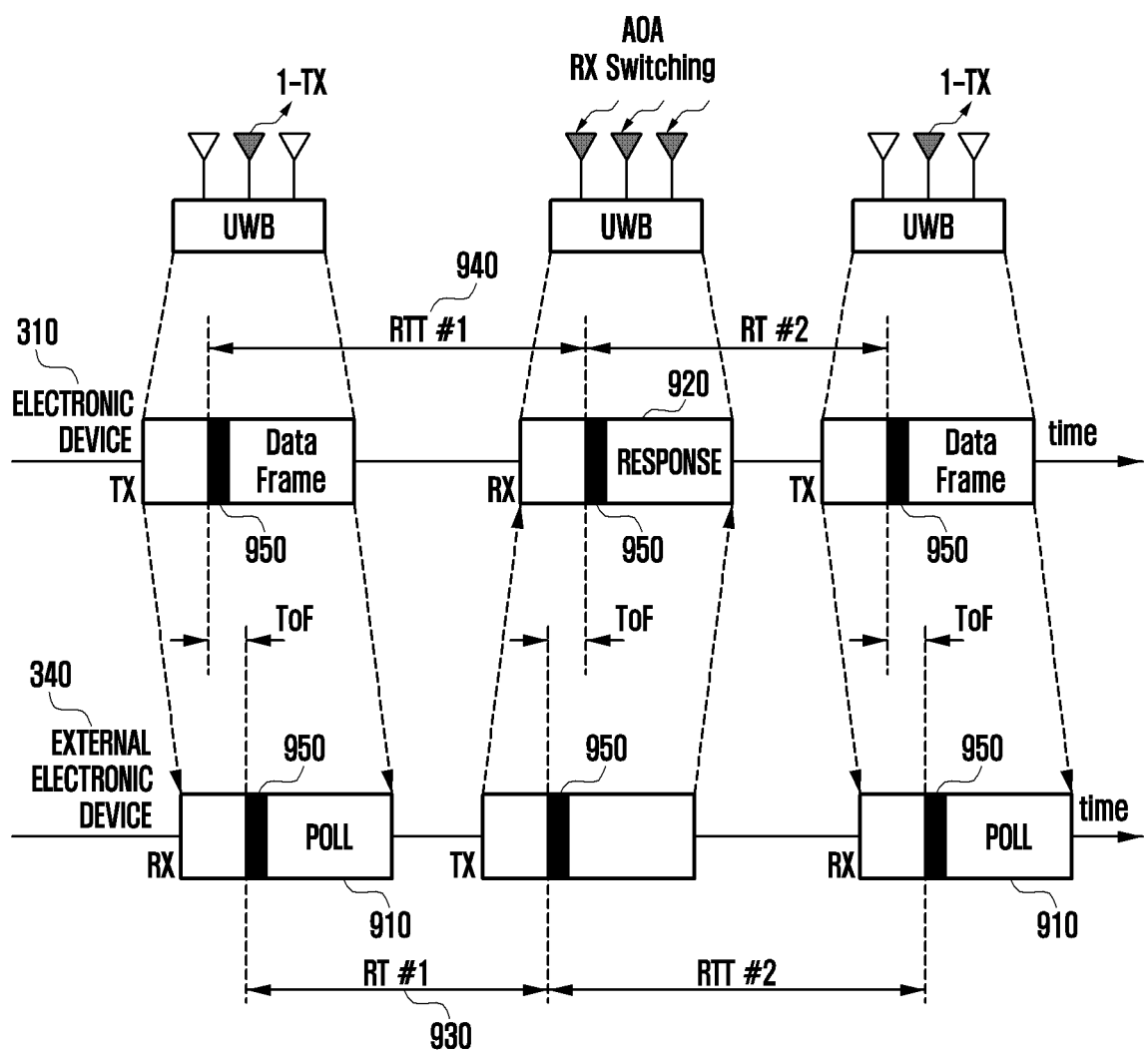
FIG. 9 illustrates a two-way ranging (TWR) operation according to an embodiment.

FIG. 9 illustrates a TWR operation according to an embodiment.

Referring to FIG. 9, the TWR operation may perform distance information measurement through single-sided (SS)-TWR and double-sided (DS)-TWR. In a SS-TWR scheme, the electronic device 310 may transmit a ranging request message (or poll message) 910 through at least one UWB antenna, and may receive a ranging response message (or response message) 920 from the external electronic device 340 through plural UWB antennas. The electronic device 310 may transmit information indicating the positioning communication cycle to the external electronic device 340 by including it in the ranging request message 910. Information related to the transmission interval may be transmitted by being included in the RIU message of the ranging request message 910.

The ranging response message includes a first reply time (RT #1) 930, which may be a time required for the external electronic device 340 to transmit the ranging response message 920 from reception of the ranging request message 910. The electronic device 310 may measure a first round trip time (RTT #1) 940 taken between transmitting the ranging request message 910 and receiving the ranging response message 920, and may measure the distance to the external electronic device 340 based on the ToF by subtracting the first reply time (RT #1) 930 from the first round trip time (RTT #1) 940. The electronic device 310 may measure the AOA with the external electronic device 340 based on the difference in arrival distances of the ranging response messages 920 received respectively by the plural UWB antennas and/or the distance to the external electronic device 340. The electronic device 310 may transmit the ranging request message 910 to the external electronic device 340 during a transmission (TX) period through reception (RX) and/or TX antennas among the plural antennas for UWB communication. The electronic device 310 may then determine the ToF by using the time difference between ranging markers (Rmarkers) 950 included in the UWB data frames of the transmitted and received messages. A method of predicting the location using a time difference as described above may be referred to as a time-of-arrival (TOA) scheme or a time-difference-of-arrival (TDOA) scheme.

The electronic device 310 may measure the distance to the external electronic device 340 by using DS-TWR. More specifically, the processor of the electronic device 310 may receive a ranging request message 910 from the external electronic device 340 through UWB communication. The electronic device 310 may transmit a ranging response message 920 including information indicating the transmission interval to the external electronic device 340. The electronic device 310 may receive a ranging final message from the external electronic device 340. The external electronic device 340 may transmit time information (e.g., time value) indicating the time that is taken for the external electronic device 340 to generate the ranging final message to the electronic device 310 by including it in the ranging final message. The electronic device 310 may calculate the distance between the electronic device 310 and the external electronic device 340 based on a time point when the ranging response message 920 is transmitted, a time point when the ranging final message is received, and time information. For example, based on the time point when the ranging response message 920 is transmitted, the time point when the ranging final message is received, and time information, the electronic device 310 may calculate a time required for the ranging response message 920 transmitted from the electronic device 310 to reach the external electronic device 340 and compute the distance by multiplying the calculated required time and the speed of light together.

Referring again to FIG. 8, in step 830, the electronic device determines a first magnification corresponding to the measured distance to and/or direction of the external electronic device, and displays an image at the determined first magnification on the display. The image may be displayed by the camera interface, or may be a map image according to the execution of a navigation application or a map application. The electronic device may also display, on the display, an identifier for the external electronic device, the distance to the external electronic device, and/or the direction of the external electronic device.

As the electronic device may track the movement of the external electronic device by using UWB communication, it may further display an indicator indicating the movement of the external electronic device on the image.

In step 840, the electronic device adjusts the magnification of the displayed image from the first magnification to a second magnification. If the second magnification (e.g., 2×) is higher than the first magnification (e.g., 1×), this may indicate zoom in; and if the second magnification (e.g., 0.5×) is lower than the first magnification (e.g., 1×), this may indicate zoom out. Adjustment of the magnification of the image may be performed by the user or may be automatically performed by determination of the electronic device. The magnification of an image may also be adjusted when the activated camera is switched.

In step 850, the electronic device adjusts the second transmission interval for the second ranging message transmitted to the external electronic device based on the adjusted second magnification. When the second magnification is higher than the first magnification, e.g., zooming in, the second transmission interval being a transmission interval for the second ranging message may be shorter than the first transmission interval. However, when the second magnification is lower than the first magnification, e.g., zooming out, the transmission interval of the second ranging message may become a third transmission interval longer than the first transmission interval. Thereafter, when the image magnification is adjusted to the first magnification, the electronic device may transmit a ranging message at the first transmission interval.

When the electronic device includes a plurality of cameras and one of the cameras is selected, the electronic device may further adjust the transmission interval for the ranging message transmitted to the external electronic device according to the selected camera. For example, if the electronic device includes an ultra-wide camera, a wide camera, and/or a tele-camera, one of them may be selected. The transmission interval for the ranging message transmitted from the electronic device to the external electronic device may be changed according to the angle of view of the operating camera. For example, the transmission interval for the ranging message transmitted by the electronic device to the external electronic device may be shortened in the order of an ultra-wide camera, a wide camera, and a tele-camera. As another example, the transmission interval for the ranging message transmitted by the electronic device 310 to the external electronic device 340 may be shortened in the order of a tele-camera, a wide camera, and an ultra-wide camera.

The transmission interval of the ranging message transmitted from the electronic device to the external electronic device may be changed according to the focal length of the camera. For example, the transmission interval of the ranging message transmitted from the electronic device to the external electronic device may be lengthened as the focal length of the camera selected for photographing is shorter.

Figure 10:
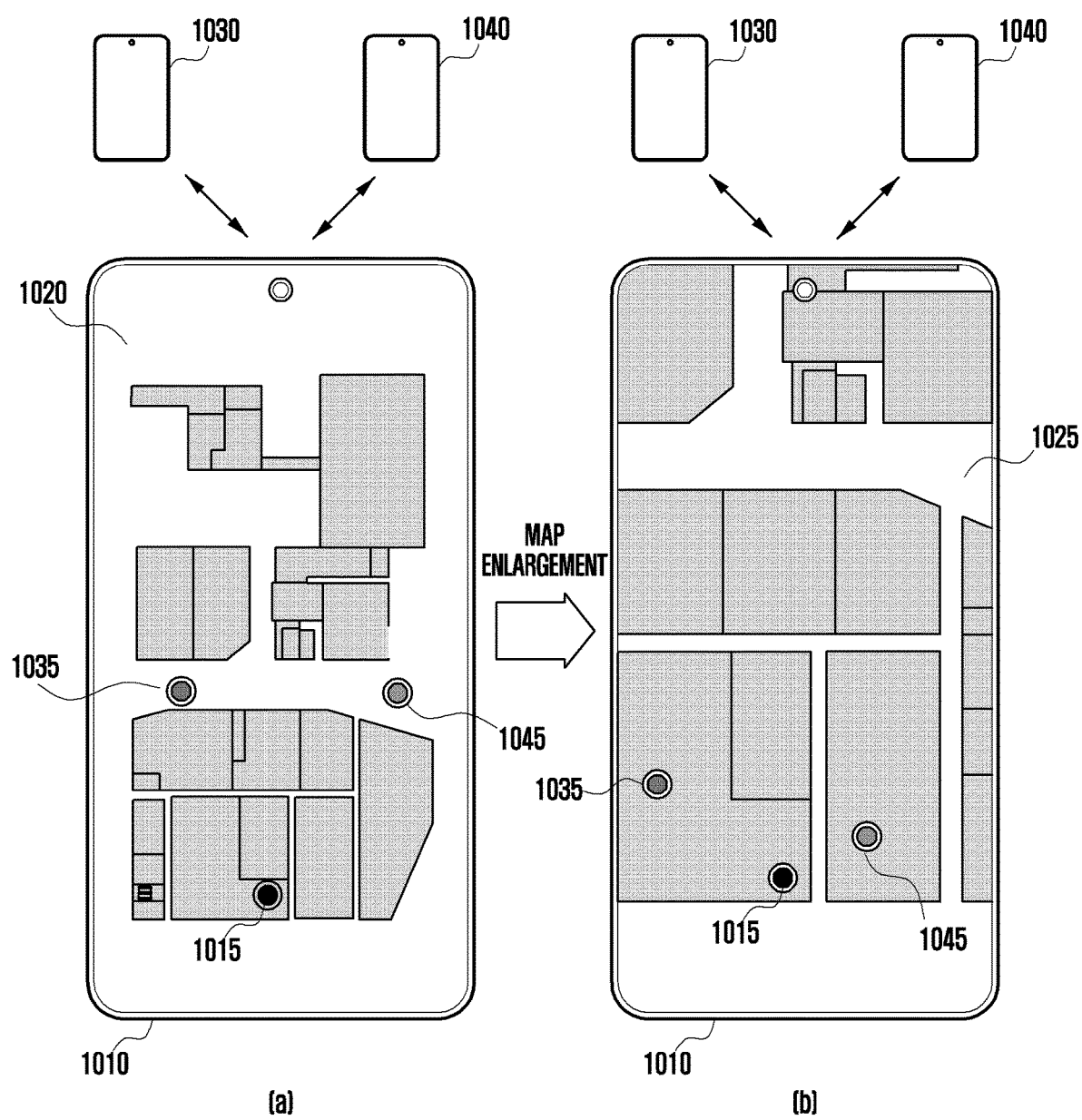
FIG. 10 illustrates a navigation application according to an embodiment.

FIG. 10 illustrates a navigation application according to an embodiment.

Referring FIG. 10, an electronic device 1010 executes a navigation application. In response to the execution of the navigation application, the electronic device 1010 may search for external electronic devices 1030 and 1040. The navigation application may provide a user interface for searching for an external electronic device.

When the navigation application is executed, the electronic device 1010 displayed a map 1020 of a given scale on the display. For example, the location 1015 of the electronic device 1010 and the locations 1035 and 1045 of the external electronic devices 1030 and 1040 are displayed on the map 1020.

The electronic device 1010 may search for the external electronic devices 1030 and 1040 by using short-range communication. The electronic device 1010 may connect to the found external electronic devices 1030 and 1040 through UWB communication. The electronic device 1010 may transmit and receive information for the UWB communication (e.g., a user ID, electronic device ID information, etc.) by using short-range communication. The electronic device 1010 may connect to the external electronic devices 1030 and 1040 through UWB communication.

The electronic device 1010 may measure the distance to the external electronic devices 1030 and 1040 through UWB communication. The electronic device 1010 may also measure the directions of the external electronic devices 1030 and 1040 through UWB communication. The electronic device 1010 may display the locations 1035 and 1045 of the external electronic devices 1030 and 1040 on the map 1020 by using the measured distance and direction information of the external electronic devices 1030 and 1040.

The electronic device 1010 may enlarge (or zoom in) the map 1020 by the user or automatically (e.g., application's setting). The electronic device 1010 may determine the locations 1035 and 1045 of the external electronic devices 1030 and 1040 by using the scale ratio between the maps 1020 and 1025 and the measured distance and direction information of the external electronic devices 1030 and 1040. The electronic device 1010 may adjust the transmission interval of the ranging request message transmitted to the external electronic devices 1030 and 1040 based on the scale ratio between the maps 1020 and 1025. The electronic device 1010 displays the locations 1035 and 1045 of the external electronic devices 1030 and 1040 on the enlarged map 1025. The electronic device 1010 may determine the scale ratio between maps 1020 and 1025 in correspondence to the farthest one among the external electronic devices 1030 and 1040.

Although the electronic device 1010 has a bar type appearance, the disclosure is not limited thereto. For example, the illustrated electronic device may be a part of a rollable electronic device or a foldable electronic device. A "rollable electronic device" may refer to an electronic device having a flexible display that is capable of bending deformation and can at least partly be wound or rolled or be accommodated in the housing. The screen display area may be expanded for use by unfolding the flexible display of the rollable electronic device or by visually exposing a larger area of the flexible display to the outside. A "foldable electronic device" may refer to an electronic device that is foldable such that two different regions of the flexible display face each other or face in opposite directions. Generally, in a carried state, the flexible display of the foldable electronic device may be folded so that two different regions thereof face each other or face in opposite directions; in an actual usage state, the user may unfold the flexible display so that two different regions form a substantially flat plate shape. The magnification of an image displayed on the flexible display or the scale of a map may vary according to the visually exposed area of the flexible display. The electronic device may adjust the transmission interval of the ranging request message based on the visually exposed area of the flexible display.

An electronic device according to the disclosure may include a UWB communication module; a display; and a processor operably connected to the UWB communication module and the display, wherein the UWB communication module may be configured to transmit a first ranging message at a first transmission interval to measure the distance to and/or direction of an external electronic device, and wherein the at least one processor may be configured to:

display, on the display, an image of a first magnification in correspondence to the measured distance to and/or direction of the external electronic device; adjust the magnification of the image to a second magnification; and control, based on the adjusted second magnification, the UWB communication module to transmit a second ranging message to the external electronic device at a second transmission interval.

The electronic device may further include a plurality of cameras, the image may indicate an image obtained by one of the plural cameras, and the processor may be configured to adjust the magnification of the image to the second magnification by switching between the cameras for obtaining the image.

The processor of the electronic device may be configured to further display an indicator on the display by tracking the movement of the external electronic device.

When the second magnification is greater than the first magnification, the processor of the electronic device may be configured to make the second transmission interval shorter than the first transmission interval.

When the second magnification is less than the first magnification, the processor of the electronic device may be configured to make the second transmission interval longer than the first transmission interval.

The image on the electronic device may be a map image according to execution of a navigation application.

The electronic device may further include a plurality of cameras, and the processor may be configured to select one of the plural cameras and further adjust a third transmission interval of a third ranging message transmitted to the external electronic device based on the selected camera.

The processor of the electronic device may be configured to further adjust the third transmission interval of the third ranging message transmitted to the external electronic device in consideration of the angle of view of the selected camera.

The processor of the electronic device may be configured to further adjust the third transmission interval of the third ranging message transmitted to the external electronic device in consideration of the focal length of the selected camera.

The processor of the electronic device may be configured to further display measured information related to the external electronic device on the display.

A method performed by an electronic device according to the disclosure may include transmitting a first ranging message, at a first transmission interval, to measure the distance to and/or direction of an external electronic device; displaying, on a display, an image of a first magnification in correspondence to the measured distance to and/or direction of the external electronic device; adjusting the magnification of the displayed image to a second magnification; and adjusting the transmission interval of a second ranging message transmitted to the external electronic device to a second transmission interval based on the adjusted second magnification.

The image may indicate an image obtained by one of plural cameras, and adjusting the magnification of the image to a second magnification may perform switching between the cameras for obtaining the image.

The method may further include displaying an indicator on the display by tracking the movement of the external electronic device.

Adjusting the transmission interval of a second ranging message may include making the transmission interval of a ranging message transmitted to the external electronic device shorter than the previous one when the magnification of the image is increased.

Adjusting the transmission interval of a second ranging message may include making the transmission interval of a ranging message transmitted to the external electronic device longer than the previous one when the magnification of the image is decreased.

The image may be a map image according to execution of a navigation application.

The method may further include selecting one of a plurality cameras; and adjusting the transmission interval of a ranging message transmitted to the external electronic device based on the selected camera.

Adjusting the transmission interval of a ranging message may include adjusting the transmission interval of a ranging message transmitted to the external electronic device in consideration of the angle of view of the selected camera.

Adjusting the transmission interval of a ranging message may include adjusting the transmission interval of a ranging message transmitted to the external electronic device in consideration of the focal length of the selected camera.

The method may further include displaying measured information related to the external electronic device on the display.

In addition, various embodiments are possible.

An electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device, comprising:
    an ultra-wideband (UWB) communication module configured to transmit a first ranging message, at a first transmission interval, for measuring at least one of a distance to or a direction of an external electronic device;
    a display; and
    a processor configured to:
        display, on the display, an image of a first magnification in correspondence to the at least one of the measured distance to or the direction of the external electronic device,
        adjust a magnification of the image to a second magnification, and
        control, based on the second magnification, the UWB communication module to transmit a second ranging message, to the external electronic device, at a second transmission interval.

2. The electronic device of claim 1, further comprising a plurality of cameras,
    wherein the image indicates an image obtained by one of the plurality of cameras, and
    wherein the processor is further configured to adjust the magnification of the image to the second magnification by switching between the plurality of cameras for obtaining the image.

3. The electronic device of claim 2, wherein the processor is further configured to display an indicator on the display by tracking movement of the external electronic device.

4. The electronic device of claim 1, wherein the processor is further configured to make the second transmission interval shorter than the first transmission interval in case that the second magnification is greater than the first magnification.

5. The electronic device of claim 1, wherein the processor is further configured to make the second transmission interval longer than the first transmission interval in case that the second magnification is less than the first magnification.

6. The electronic device of claim 1, wherein the image includes a map image according to execution of a navigation application.

7. The electronic device of claim 1, further comprising a plurality of cameras,
    wherein the processor is further configured to:
        select one of the plurality of cameras, and
        adjust a third transmission interval of a third ranging message transmitted to the external electronic device based on the selected camera.

8. The electronic device of claim 7, wherein the processor is further configured to adjust the third transmission interval of the third ranging message in consideration of an angle of view of the selected camera.

9. The electronic device of claim 7, wherein the processor is further configured to adjust the third transmission interval of the third ranging message in consideration of a focal length of the selected camera.

10. The electronic device of claim 1, wherein the processor is further configured to display measured information related to the external electronic device on the display.

11. A method performed by an electronic device, the method comprising:
    transmitting a first ranging message, at a first transmission interval, for measuring at least one of a distance to or a direction of an external electronic device;

displaying, on a display, an image of a first magnification in correspondence to the at least one of the measured distance to or the direction of the external electronic device;

adjusting a magnification of the displayed image to a second magnification; and adjusting a transmission interval of a second ranging message transmitted, to the external electronic device, to a second transmission interval based on the second magnification.

12. The method of claim 11, wherein the image indicates an image obtained by one of a plurality of cameras; and wherein adjusting the magnification of the image to the second magnification comprises switching between the plurality of cameras for obtaining the image.

13. The method of claim 12, further comprising displaying an indicator on the display by tracking movement of the external electronic device.

14. The method of claim 11, wherein adjusting the transmission interval of the second ranging message comprises making the transmission interval of the second ranging message transmitted to the external electronic device shorter than the first ranging message, in case that the magnification of the image is increased.

15. The method of claim 11, wherein adjusting the transmission interval of the second ranging message comprises making the transmission interval of the second ranging message transmitted to the external electronic device longer than the first ranging message, in case that the magnification of the image is decreased.

16. The method of claim 11, wherein the image includes a map image according to execution of a navigation application.

17. The method of claim 11, further comprising:
selecting one of a plurality of cameras; and
adjusting a third transmission interval of a third ranging message transmitted to the external electronic device based on the selected camera.

18. The method of claim 17, wherein adjusting the transmission interval of the third ranging message comprises adjusting the transmission interval of the third ranging message in consideration of an angle of view of the selected camera.

19. The method of claim 17, wherein adjusting the transmission interval of the third ranging message comprises adjusting the transmission interval of the third ranging message in consideration of a focal length of the selected camera.

20. The method of claim 11, further comprising displaying measured information related to the external electronic device on the display.

* * * * *